Nov. 15, 1960     C. W. MADSON     2,959,972
SINGLE BALL JOINT ROLLER SUPPORT FOR TOROIDAL
VARIABLE RATIO TRANSMISSIONS

Filed Feb. 11, 1959     4 Sheets-Sheet 1

INVENTOR
CHRIS W. MADSON.

BY
ATTORNEYS.

INVENTOR
CHRIS W. MADSON.

BY
ATTORNEYS.

Nov. 15, 1960         C. W. MADSON         2,959,972
SINGLE BALL JOINT ROLLER SUPPORT FOR TOROIDAL
VARIABLE RATIO TRANSMISSIONS
Filed Feb. 11, 1959                  4 Sheets-Sheet 4
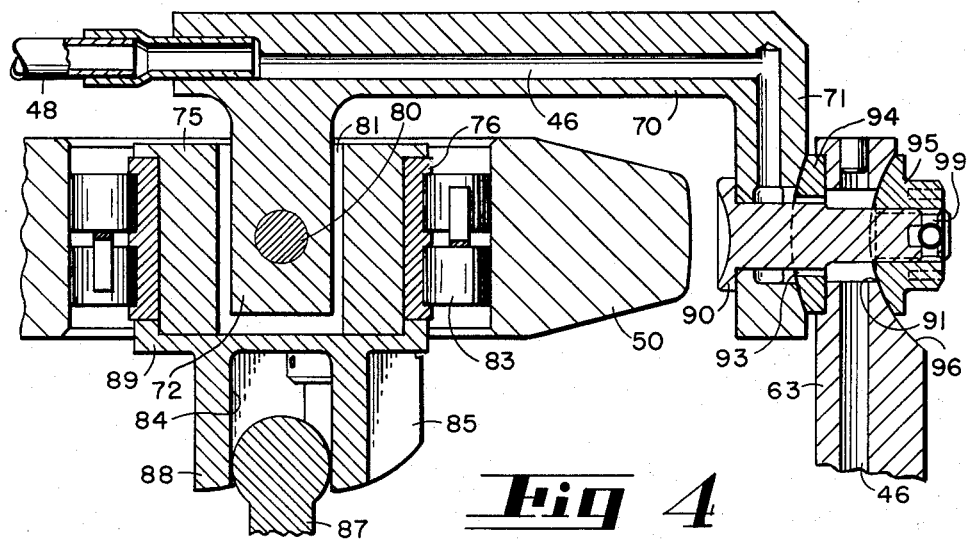
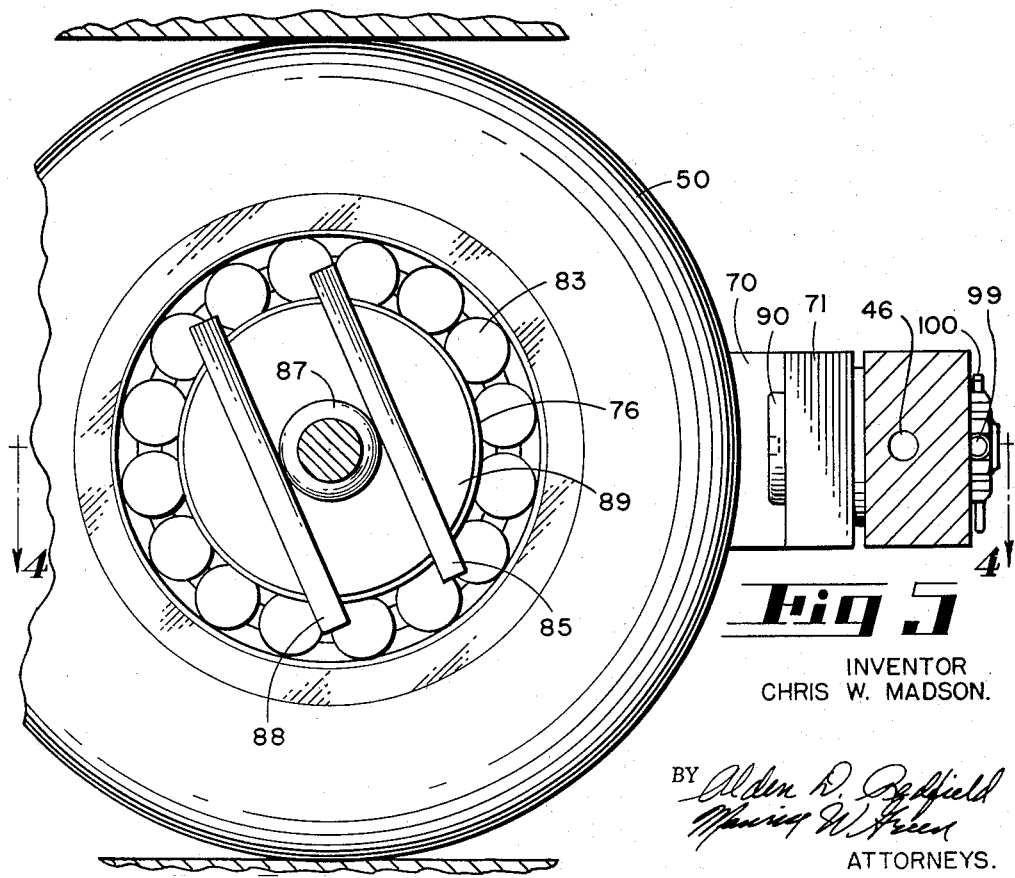
INVENTOR
CHRIS W. MADSON.
ATTORNEYS.

United States Patent Office 2,959,972
Patented Nov. 15, 1960

2,959,972

SINGLE BALL JOINT ROLLER SUPPORT FOR TOROIDAL VARIABLE RATIO TRANSMISSIONS

Chris W. Madson, Orange, Conn., assignor to Avco Manufacturing Corporation, Lycoming Division, Stratford, Conn., a corporation of Delaware Filed Feb. 11, 1959, Ser. No. 792,543

6 Claims. (Cl. 74—200)

This invention relates to an improvement in a roll positioning system for effecting a change in the drive ratio between the input and output of opposed toroid friction disks, known elements used in a toroidal type of variable ratio transmission.

As a matter of orientation of the improvement constituting this invention, it is to be noted that the speed ratio change mechanism of the type to which this improvement is applicable generally employs a combination including opposed, grooved toroidal friction disks which have interposed therebetween friction wheels or rollers transmitting the drive from one disk to its complementary opposite disk. Such wheels or rollers ride in semi-circular grooves provided in each of the disks and thus transmit power, through frictional force, from one toroid to the other.

The referred to grooves which are formed in each of the opposed disks are annular grooves of semi-circular cross-section formed in the opposed faces of the disks. The intermediate torque transmitting rollers are adjustable, in the embodiment of the invention here considered, in two different planes of movement and by this adjustability a variation in the speed ratio between disks is obtained. When the rollers are positioned right angularly with respect to the plane of rotation of the disks, the gear ratio is 1:1, whereas if the vertical disposition of the rollers is angularly deviated in one direction, the driving disk may drive the intermediate rollers nearer its circumference with such rollers contacting the driven disk nearer its axis of rotation. In this instance the result is to increase the speed ratio between the disks whereas with an angular deviation of the rollers in an opposite direction, the converse result occurs, the rollers then contacting the driving toroid nearer its axis of rotation and the driven toroid nearer its circumference, the result then being to accomplish a reduced speed ratio.

In the instant invention, a plurality of these friction rollers are employed and these are mounted not only for rotation about their axes for effecting drive, but as just suggested, are mounted for tilting movement in a plane still coincident with the axis of rotation of the disks. They are also supported for movement angularly to this axis for steering the disks. Such steering movement results in the tilting effect through a "climbing" or "floating" responsive movement of the disks, and the latter changes the drive ratio between the input and output toroidal friction disks, as just described.

With this understanding of the general nature of the mechanism to which this invention is applicable, it is pointed out that the crux of this improvement is found in a peculiar type of support for each of the rollers which includes an overhanging support arm that is mounted not only for relative rotary movement to permit the angular deviation which effectuates change in the gear ratio but is also mounted for slight angular movement in any direction with respect to the stated axis.

In normal operation of transmissions of the type herein broadly contemplated, difficulty has been encountered in compensating for imperfections by way of improper tolerances. Mechanisms of this type must be highly machined for accuracy in performance and even then slight imperfections in the curved surfaces of the toroids, the contacting surfaces of the driving rollers or other moving parts may cause inaccuracy or imperfection in operation. It is thus a definite problem to assure satisfactory alignment of the rolls, to compensate for variations caused by manufacturing tolerances, to compensate for variation resulting from load changes, and to compensate for variation in alignment resulting from changes in speed.

Proper alignment is fully assured by the ball joint mounting of the instant invention which fully permits the individual rollers to readily seek and maintain that position coinciding with the geometrical center of the torus or center of the circle formed (in cross-section) by the oppositely disposed toroids.

The invention is also particularly useful in transmissions of this order wherein the basic concept of obtaining variations in the drive ratio involves an initial steering action, the latter functioning to steer or displace the drive roller elements to one side but in a plane of rotation which is still disposed vertically to the plane of rotation of the toroids.

It is therefore a primary object of the present invention to provide a unique support structure for the drive rolls which are located between the toroid disks of a transmission assembly of the above identified type, which support structure permits a tilting movement to accomplish change in speed ratio, but also allows limited freedom of movement in a manner which will compensate for minor variations and thereby assure a more satisfactory alignment of the plurality of drive rolls necessary to accomplish the desired result.

An additional object of the invention is the provision of a novel control means for the individual roller elements in such a system, which control means effectuates the initial steering function that ultimately creates a tilt to vary the speed ratio between disks. In this respect in the instant invention, a control ring is axially mounted with respect to the axis of rotation of the disks and is provided with a control button positioned in between the inner side of each roller and such axis. This control button is adapted to slide within a control slot which is also mounted upon the inner side of each roller within the meaning of the foregoing statement. In other words, the control mechanism is one which is located interiorly of the transmission unit, in contrast to a cam arrangement which is exterior with respect to the several roller elements.

It is another object of this invention to provide a toroidal transmission mechanism wherein the intermediate driving rollers therefor are mounted upon an over-hanging support arm and so positioned and arranged that the same can initially be steered by a button and cam slot arrangement and then subsequently, and by this steering action, tilted angularly to their original plane of rotation (i.e., a 1:1 ratio) to change that speed ratio to the desired degree.

Another object of the invention is a support structure for each of the intermediate rolls which is carried by a pivot pin enabling tilting of the rollers in the manner herein described, the interconnection between pivot and support structure being one of spherical surface contact so that other movement of the support arm is accomplished aside from the primary movement which involves the aforesaid tilting action. This latter movement performs the stated function of obtaining more perfect alignment in the drive relationship and hence, better performance.

It is another objective of this invention to provide a roll supporting means which enables automatic alignment of the rolls with their respective toroids by permitting them to "float" into position so that the centers of the roll diameters are coincident with the toroid radii centers.

It is a final objective of the invention to provide a roller support means in units of the described type which perform more efficiently to obtain an equal load sharing between the rollers with a corresponding increase in power transmissibility as well as a corresponding reduction in heat rejection.

Other objects and advantages of the instant invention will be apparent from the following more detailed description herein, and where reference to the following figures is made:

Figure 3 is an enlarged sectional view of one of the toroidal rollers as seen in Figure 2;

Figure 4 is a sectional view taken on the line 4—4 of Figure 5;

Figure 1:
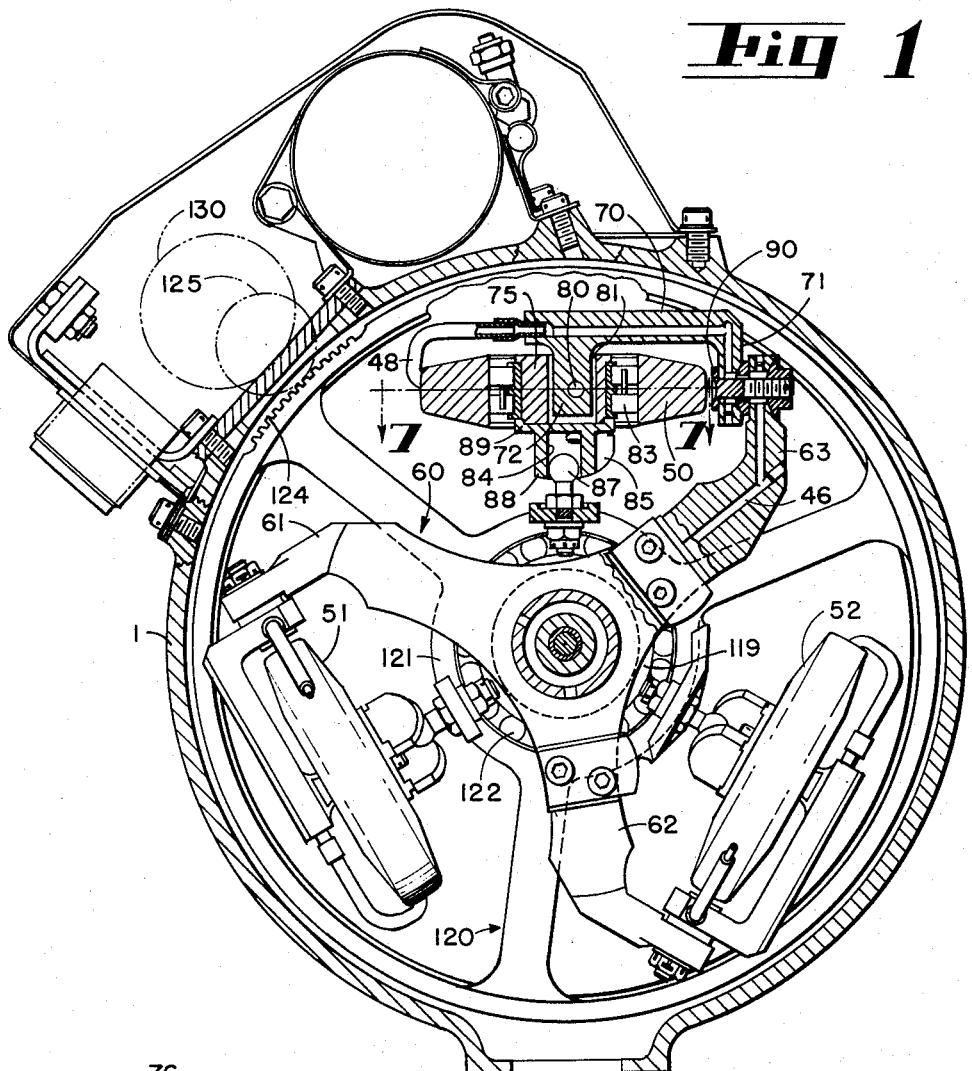
Figure 1 is an elevation view of the invention with certain parts thereof in section and with the respective toroids removed.

The entire transmission assembly, in the embodiment herein described, is positioned within a tubular casing 1 provided upon each side with customary circular side walls 2 and 3. The toroidal disks are represented at 5 and 7, respectively (Figure 2), and mounted as shown in opposed fashion for reception therebetween of the several driving rollers. In this instance the driving toroid is indicated at 5 and the driven toroid 7, each being mounted upon the same axis and exactly opposite each other. Each toroid is provided with grooves 8 and 9 respectively, the latter being semi-circular in cross-section and of exactly the same spherical shape. Together these grooves form a circular toroidal cross-section.

The driving toroid disk 5, or input disk 5, through the referred to rollers delivers torque to the output toroid 7. Both elements are mounted upon the common stationary shaft generally indicated at 10 and composed of two shaft elements, one of which, 10a, is adapted to interfit into a bore of complementary size in the other shaft 10b, to which it is securely splined for relative axial movement. These two shaft elements upon which the toroids rotate are thus telescopically interfitted and when the intermediate friction rollers are placed therebetween the same may be compressed together or forced into a resiliently maintained drive relationship by a load bolt 15 positioned as shown, for example, in Figure 2.

Both shaft components as just described are securely mounted to the main casing 1 in any suitable manner as by a spider element 29 which may be formed as an integral part of the main shaft unit 10a. The load bolt 15 is provided with a series of coned disks 17, the same affording some elasticity to the compressive forces exerted against the rollers. These also permit constant contact pressure even though there be some irregularity or unevenness in the respective contact surfaces. The amount of pressure exerted by the load bolt 15 is regulated by the nut 18 which may be taken up to the desired extent for this purpose.

Each of the toroids are rotatably mounted upon this fixed axle or shaft 10 by means of ball bearings 20 and 21, the latter in effect being of a type to function also as thrust bearings.

The input shaft 25 of this unit is directly secured to a circular member or spider element 27 and the latter in turn affixed to the input toroid 5 in any suitable or known manner so that shaft and toroid rotate together, the shaft being journaled in suitable ball bearings 28. The latter are in turn positioned within the end circular member 2.

From the foregoing it is seen that power is transmitted from the input shaft 25 directly to toroid 5, and thence by friction drive through the intermediate rollers, to output toroid 7. Toroid 7 in turn drives an appropriate gear train, the first gear 35 of which is secured in any suitable manner to the output toroid 7. This gear 35 is arranged to drive a common form of gear reduction transmission such as a planetary gear arrangement generally indicated at 40. These various gear elements form no part of this invention, and are well known in the art, it being only necessary to point out that ultimately torque is delivered to the output shaft 42. The oil system for supplying oil to the toroidal disks and intermediate wheels is obtained through the various lines 46 which ultimately terminate in spouts 48 (Figure 1) that feed directly into the path of the individual roller elements.

Transmission of power from one toroid to the other is attained through three equally spaced roller elements 50, 51 and 52 (Figure 1). Each of these rollers, as well as the supports and controls for the same, is fabricated in precisely the same manner and hence, description of one will suffice as a description of all three. Thus in the various figures the intermediate drive roller here particularly described is indicated at 50 and shown in all of the several views.

Figure 2:
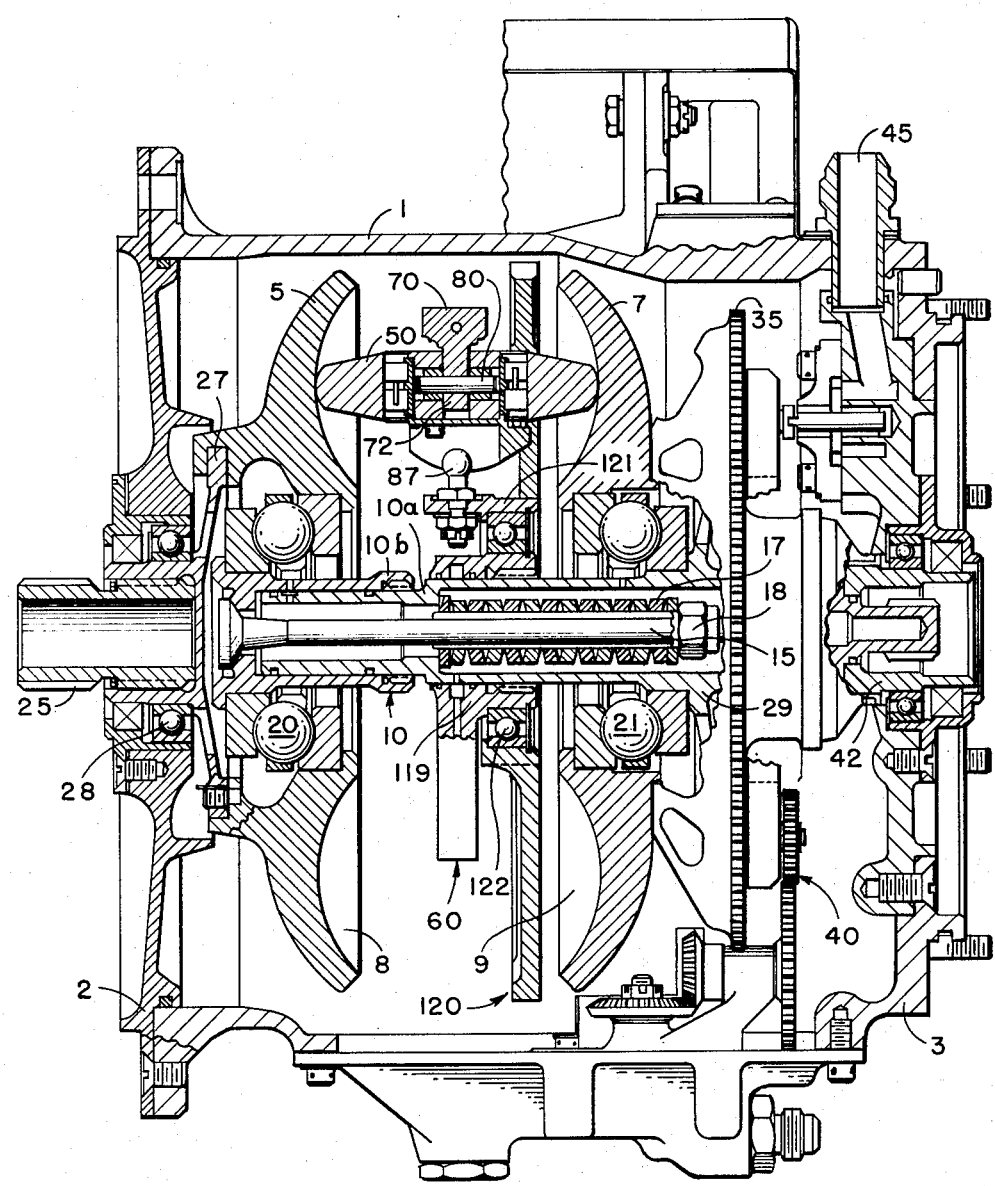
Figure 2 is a vertical axial section view of the invention as shown in Figure 1 and further showing the relative location of the roller elements and opposed toroidal disks.

As viewed in Figure 2 of the drawings, it will be understood that here a 1:1 ratio exists between the input and output toroids by reason of the fact that that roller is at its intermediate point, i.e., the contact of the periphery of the roller with the opposed toroidal surfaces is the same distance from the center of rotation of the input 5 as it is from the rotation center of the output toroid 7. Stated differently, the toroid at a 1:1 ratio position operates in a plane of rotation which is vertical or normal to the plane of rotation of the opposed toroids.

The referred to three rollers are each mounted in identical fashion upon a triangular support member or fixed cage generally indicated at 60 and having three separate arms 61, 62 and 63. Again referring particularly to the support for only one of the wheels, i.e., roll 50, it is seen that the arm 63, through a king pin arrangement to be described in more detail later, in turn interconnects with an overhanging support arm 70. The latter has a right angular bearing member or shaft 72 upon which the cam body 75 is mounted, this cam body being circumferentially fitted with a bearing race 76. A pin 80, right angularly disposed with respect to the axis of the shaft 72 is mounted within an appropriate aperture in the latter, this pin permitting limited steering movement of the roller. Sufficient clearance 81 is provided between the cam body and the bearing member or shaft 72 to achieve this function. (See Figure 4.)

The roller 50, typical of the others, is journaled upon the cam body 75, suitable anti-friction roller bearings 83 being interposed between wheel and cam body race 76. A cam slot 84, adapted to receive the steering button 87 can be made integral with the journal or bearing surface 76, or separately made and affixed thereto upon the circular element 89. The cam consists of two parallel and spaced-apart members 85 and 88, and as viewed for example in Figure 1, such cam, when the wheel is in the position of a 1:1 ratio is angularly inclined to a plane extending at right angles to the two toroids.

Figure 7:
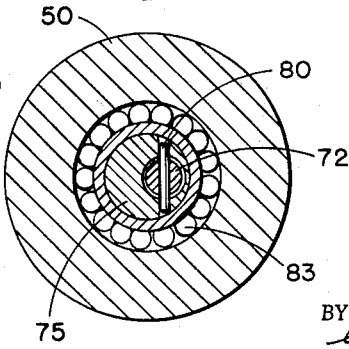
Figure 7 is a sectional view taken on the line 7—7 of Figure 1, illustrating a castered mount for a roller.

In Figure 1 the bore in the cam body which receives the shaft 72 is shown as being eccentrically disposed with respect to the center of the cam body. This is more graphically illustrated in Figure 7. Such mounting of the roller in this off-center fashion provides a castering effect which facilitates not only the steering of the individual roller to the right or left (viewing Figure 1), but also therefore functions to accelerate the tracking or floating of the roller into that canted position which will vary the speed ratio between toroids.

Figure 8:
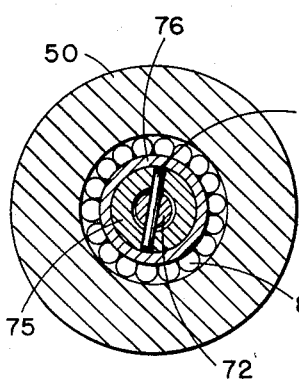
Figure 8 is a modified version of an intermediate roller, similar to the structure shown in Figure 7, but illustrating a toroid contacting roller having a castered steering shaft of different design.

On the other hand, and as shown in Figures 4 and 8, if so desired, the referred to castering effect may be obtained by angularly inclining the pivot or king pin 80 as graphically illustrated in Figure 8.

In any event, the immediate control mechanism to effectuate steering is located interiorly of each of the friction rollers rather than upon the outside of the same. Such facilitates movement and prompt response of the several component parts of the control mechanism including the control ring and its interconnection with the roller through the cam button 87, the latter being adapted to slide within the interiorly mounted cam slot 84. The relative positioning of these several component parts should be clearly understood by reference to both Figures 1 and 2 of the instant drawings.

Figure 6:
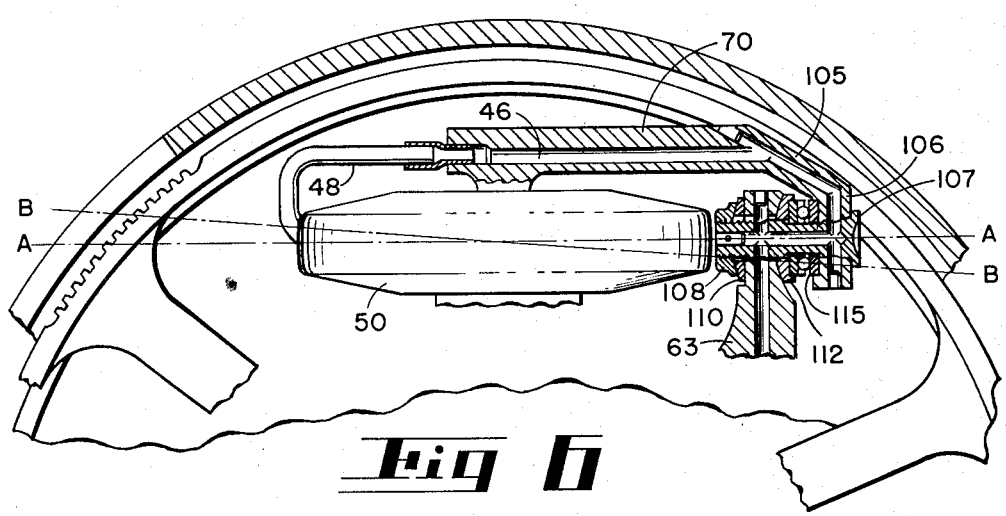
Figure 6 is a view of a toroid contacting roller similar to that shown in Figure 1, but illustrating a modified supporting arm.

The fundamental operation of the apparatus described in the foregoing, in order to change the speed ratio between toroids, may be briefly described as follows: a steering of the roll from an assumed midpoint line A—A, as diagrammatically indicated in Figure 6, to a position angled with respect to such line or to a position graphically indicated as line B—B, is a movement in a clockwise direction. The left-hand edge of the roller, as seen in Figure 6, will thus be moved upward and the right-hand edge thereof downward. Thus the roll 50 changes its plane of rotary movement from the plane indicated by line A—A to the plane indicated by the line B—B, accomplished with reference to an axis which lies parallel to the plane of rotation of the toroids. This constitutes the referred to "steering action," directional steering in this manner being promptly followed by a tilt of the roller due to the consequent tracking or floating thereof along the curved toroidal grooves. In counter-distinction to this steering action, the tilting here referred to is angular to a plane perpendicular to the opposed faces or to the respective planes of rotation of the two toroids.

This tilting movement, accomplished as a function of the initial steering, is illustrated diagrammatically in Figure 3 where the roller is positioned along the line M—M in a 1:1 speed ratio position. The angle of tilt is here shown as the angle between line M—M and the line O—O, the final position of angularity. It is now seen that when the roller has floated to the position O—O, the same is in contact with a larger diameter on the input toroid 5 and a smaller diameter of the output toroid 7. The result is that the output toroid rotates at greater speed than the input. A tilt in an opposite direction will result in a converse effect, the described arrangement achieving an infinite and continuous number of gear ratio changes.

The king pin structure for the overhanging arm support 70 and its function in the instant assembly constitutes a primary concept of this invention. Referring particularly to Figure 4, it is seen that the king pin 90 is positioned through a suitable aperture in the right angular portion 71 of the wheel supporting arm 70. A larger aperture 91 for this purpose is formed in the arm 63, the opening 91 permitting oil flow from the bore 46 through clearance 93, and ultimately into and through the support 70. The king pin is mounted in such a fashion as to permit axial "tilting" of the rollers as well as angular movement of the leg 70 with respect to the arm 63. This is accomplished by means of a spherical washer 94 and a spherical nut 95. One side of the washer 94 is flat as indicated in Figure 4 so as to permit its firm seating within an appropriate depression formed in the end of the arm 63. The washer is provided with the referred to clearance 93 for the purpose above described. The opposite face of the washer, as already indicated above, is of spherical contour, i.e., representing a spherical segment, and it is positioned within a concave depression, spherical in configuration and identically matching the spherical face of the washer 94. The spherical nut 95 is as seen in this Figure 4, also formed with a contacting face having a configuration of a spherical segment. Such contacting face is adapted to sit within fine tolerances within a complementary concavity 96 formed upon the opposite side of the leg 63. The spherical contours of both nut 95 and washer 94 are formulated upon a common sphere center. The right angular portion 71 of the supporting arm 70 and the leg 63 are thus affixed together in such fashion as to permit movement between the described and contacting spherical faces of washer and nut on the one hand and the member 71 and leg 63 on the other.

The described elements are maintained in the position shown by the spherical nut 95 which is threaded upon the end of the king pin 90, and turned to the desired rigidity between element 71 and member 63. Such relationship will be set up in such fashion as to maintain a relatively rigid support for the roller 50, yet at the same time to not only permit "tilting" or pivoting of the roller 50 on the kin pin axis, but also slight deviation of the axis of the king pin 90 angularly, thus permitting the individual rollers to readily seek and maintain that position coinciding with the geometrical center of the torus.

Figure 5:
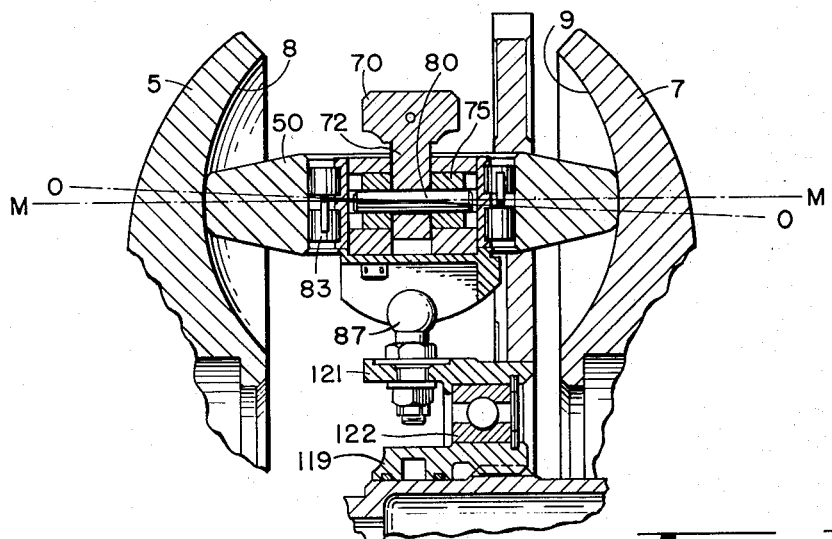
Figure 5 is an enlarged bottom plan view of the construction of one of the intermediate roller elements.

An alternative king pin arrangement to that just described is shown in Figure 6, where it will be seen that the support arm 70 is provided with such angular bends as to position it upon the outside (viewing this figure) of the element 63. In other words, here the support arm is provided with one angular bend 105 and a right angular extension thereof, 106, to which the king pin 107 is directly attached. In this version the spherical nut 108 is adjacent the roller 50 and bears against a convex spherical shim or washer 110. Upon the opposite side of the element 63 and between support arm and such element is affixed another spherical washer 112 of comparable contour, the latter seating within a concavity in the arm 63 of like shape. The spherical washer 112 is spaced from the element or extension 106 by a series of flat washers or shims 115. The operation of this alternate embodiment is the same as that with respect to the king pin assembly of Figures 4 and 5, the spherical washer, upon tightening to the desired extent, compressing the several members together to maintain the arm 70 in a relatively rigid manner but permitting tilting of the pin 107 as well as deviation angularly to achieve proper alignment.

As in the arrangement described with respect to Figure 4, the respective surface of spherical washer and spherical nut are, in this instance, also surfaces representative of spherical segments taken upon the same common sphere centerpoint, and varying only in length of radius. In both versions it is thus seen that whereas tilting of the wheel is accomplished by turning of the leg 70 on the king pin as the pivot point, angular deviation of the king pin with respect to its position as shown in Figure 4 is possible by the sliding of the leg 71 upon the spherical surface of the washer 94, and a corresponding sliding of the spherical surface of the nut 95 in the complementary concavity 96. In the preferred embodiment of the invention, the clearance 93 is such that an angular deviation of the type is of an order to accomplish the functions of the invention as set forth in the foregoing and of that degree readily determinable by those skilled in the art.

Mention has been made of the slot 84 and button 87 which, riding in this slot, functions to steer an intermediate roller to the right or left (viewing Figure 1). Such steering mechanism is remotely controlled. The immediate elements only of such control mechanism are herein described. In this respect, it is to be observed that a control ring 120 is mounted for rotation upon a hub 119 which is directly affixed to the stationary shaft 10a. This ring is also provided with a central hub 121 about which it rotates, with antifriction bearings 122 being interposed between hubs 119 and 121 (see Figure 2). At spaced intervals to coincide with positions opposite the three slots 84 the hub 121 may be extended and apertured to receive the button 87, the latter being bolted to this structure in the usual fashion. The control ring 120 may thus freely be rotated in either direction. Such rotation is remotely accomplished through a gear arrangement which directly engages the teeth 124 cut in the rim or periphery of this control ring 120. Such gear arrangement is but diagrammatically indicated in Figure 1 at 125 and 130, the same, and other exterior controls for movement of the ring being well known to the art and forming no part of this invention.

In operation of this assembly, which has just been described, it will be appreciated that if the control ring is rotated to the right or in a clockwise direction (viewing Figure 1), pressure is brought to bear upon one side of the cam element 85 and hence, upon the wheel, so as to steer the wheel in counter-clockwise direction. When the ring is thus rotated the rolls are consequently first rotated about the steering pins 80 to give steering action to them, such being comparable to the steering action of the front wheels of an automobile. When the control ring 120 is rotated in the same direction as a given toroid, the contact point of the roll surface on that toroid is steering radially inward to cause that surface to move inward on the toroid. Conversely, if the control ring 120 is rotated in a direction opposite the direction of rotation of a toroid, the contact point on that toroid is steered radially outward. In either event, the result of the initial steering action is to cause, by "floating" of the individual wheels, almost simultaneous "tilt" or variation in angularity of the individual rolls about the axis of the king pin 90.

It is characteristic of the drive from the input to the output through the rotating rolls that the input toroid necessarily rotates in a direction opposite to that of the output toroid and therefore, for motion of the control ring 120 in one direction, the contact point on one toroid is steered outward and the contact point on the other toroid is steered inward. Hence, the roll 50, for example, is steered in a direction to change its position and, as a consequence thereof, the speed ratio between toroids.

In order that the rolls 50, 51 and 52 seek positions proportional to that of the movement of the ring 120, the slots 84, in the cam elements 89, are at such an angle, (as explained supra) that as the rolls move toward their new position the amount of steering action for lateral movement in the roll (as seen in Figure 1) starts to decrease once the movement of the control ring 120 is stopped. At the final position of the rolls (Figure 1) the tilt about the axis of the steering pin 80 is again zero. Thus, it appears that by rotary movement of the control ring 120 in one direction the speed ratio will be increased and in the opposite direction the speed ratio will be decreased, such movement being in proportion to the angular movement of the control ring.

It is thus seen that the foregoing invention presents a simplified solution to the problem of obtaining accurate and proper tilting of the friction rollers to obtain a change in speed ratio despite presence of those factors tending toward inefficiency of operation. In other words, by reason of the peculiar overhanging arm support construction for the rollers which is herein described, tilting is accomplished in a manner as to fully compensate for many possible and inherent variations resulting from either manufacturing tolerances, load changes, or possible inaccuracies in alignment resulting from speed changes. More specifically, the ball joint mounting of the instant invention causes the individual rollers to properly and readily seek that position thereof which coincides with the geometrical center of the torus, thus assuring at all times proper disposition of the rollers for effective drive action.

Although only the preferred embodiments of the invention have been herein illustrated and described, it is to be understood that this invention is not to be confined to these only, but that other alternates and variations are possible, the invention only to be confined to that scope which is expressed by the claims appended hereto.

I claim:

1. In a toroidal transmission mechanism having opposed toroid disks with a driving roller therebetween, means to steer and tilt said roller to change the speed ratio between said disks and means to support said roller including a support arm and a stationary mounting, an interconnection between said arm and said mounting permitting tilting of the axis of rotation of said roller with limited freedom of movement apart from said steering and tilting means, said interconnection comprising a first spherical surface on said arm and a complementary spherical surface on said mounting in contacting relationship with said first surface, and means to maintain said surfaces in relatively fixed but angularly movable relationship with respect to each other.

2. In a toroidal transmission mechanism having opposed toroid disks with a driving roller therebetween, means to steer and tilt said roller to change the speed ratio between said disks and means to support said roller including a support arm and a stationary mounting, a king pin interconnection between said arm and said mounting permitting tilting of the axis of rotation of said roller, said interconnection providing means for limited freedom of movement apart from said steering and tilting means comprising a concave spherical surface on said arm and a complementary convex spherical surface on said mounting in contacting relationship with said concave surface, and means to maintain said surface in pivotal and angularly movable relationship with respect to each other.

3. In a toroidal transmission mechanism having opposed toroid disks and a cam support provided with a driving roller therebetween, means to steer and tilt said roller to change the speed ratio between said disks, said means comprising a cam slot on said cam support, said cam slot being positioned on the side of said roller nearer the axis of rotation of said disks, a rotatable control ring axially mounted with respect to said disks, a cam button on said ring positioned to ride in said cam slot, whereby rotation of said ring steers said roller, means to support said roller including a support arm and a stationary mounting, an interconnection between said arm and said mounting permitting tilting of the axis of rotation of said roller, said interconnection providing means for limited freedom of movement apart from said steering and tilting means and comprising a first spherical surface on said arm and a complementary spherical surface on said mounting in contacting relationship with said first surface, and means to maintain said surfaces in relatively fixed but angularly movable relationship with respect to each other.

4. In a toroidal transmission mechanism having opposed toroid disks mounted for rotation upon a common axis and a cam support provided with a driving roller therebetween, means to steer and tilt said roller to change the speed ratio between said disks, said means including a cam slot on said cam support, said cam slot being positioned on the side of said roller nearer the axis of rotation of said disks, a rotatable control ring mounted upon said axis, a cam button on said ring positioned to ride in said cam slot, whereby rotation of said ring turns said roller to one side, means to support said roller including a support arm and a stationary mounting, an interconnection between said arm and said mounting permitting tilting of the axis of rotation of said roller, said interconnection providing means for a limited freedom of movement apart from said steering and tilting means and comprising a spherical washer and a spherical nut, said arm and said mounting having spherical concavities to match said washer and said nut respectively, and means to maintain said matching surfaces in relatively fixed but angularly movable relationship with respect to each other.

5. In a toroidal type variable ratio transmission assembly having rotatable and opposed toroidal friction disks with opposed friction roller grooves therein, a plurality of friction rollers between said disks and in frictional engagement with said opposed grooves, said rollers being mounted for rotation in a plane normal to the plane of rotation of said disks at the condition of 1:1 speed ratio, means to permit tilting of the plane of rotation of said rollers to change the drive ratio between said disks and to permit deviation at an angle to the axis of said tilt, said means comprising a support arm for each of said rollers, a stationary mounting and an interconnection between said mounting and said arm, said interconnection comprising a first spherical surface on said arm and a complementary spherical surface on said mounting in contacting relationship with said first surface, and means to maintain said surfaces in pivotal and angularly movable relationship with respect to each other.

6. In a toroidal type variable ratio transmission assembly having rotatable and opposed toroidal friction disks with opposed friction roller grooves therein, a plurality of friction rollers between said disks and in frictional engagement with said opposed grooves, said rollers being mounted for rotation in a plane normal to the plane of rotation of said disks at the condition of 1:1 speed ratio, means to permit tilting of the plane of rotation of said rollers to change the drive ratio between said disks and to permit deviation at an angle to the axis of said tilt, said means comprising a support arm for each of said rollers, a stationary mounting and an interconnection between said mounting and said arm, said interconnection comprising a first spherical surface on said arm and a complementary spherical surface on said mounting in contacting relationship with said first surface, means permitting movement of said surfaces both axially and angularly with respect to each other, and means to steer each of said rollers in said normal plane, said last named means comprising a cam support on said support arm, a cam slot on said cam support, said cam slot being positioned on the side of said roller nearer the axis of rotation of said disks, a rotatable control ring, a cam button on said control ring positioned to seat in said cam slot, and means to rotate said control ring.

References Cited in the file of this patent

UNITED STATES PATENTS

| 2,076,057 | Almen | Apr. 6, 1937 |
| 2,113,638 | Almen | Apr. 12, 1938 |

FOREIGN PATENTS

| 1,007,590 | Germany | May 2, 1957 |